April 19, 1927. 1,625,270

C. F. MÉNDEZ

SPRING WHEEL

Filed March 26, 1924  2 Sheets-Sheet 1

Inventor:
CIRO FIDEL MÉNDEZ,
By Ogle R. Singleton
Attorney

April 19, 1927.

C. F. MÉNDEZ 1,625,270

SPRING WHEEL

Filed March 26, 1924 — 2 Sheets-Sheet 2

Inventor:
CIRO FIDEL MÉNDEZ,
By Ogle R. Singleton
Attorney

Patented Apr. 19, 1927.

1,625,270

UNITED STATES PATENT OFFICE.

CIRO FIDEL MÉNDEZ, OF MEXICO CITY, MEXICO, ASSIGNOR TO IRVING S. COOPER, OF LOS ANGELES, CALIFORNIA.

SPRING WHEEL.

Application filed March 26, 1924. Serial No. 701,990.

My invention consists in a new and useful improvement in spring wheels and is designed to provide a resiliently mounted vehicle wheel in which the hub is provided with radial extensions supported by a plurality of minor hubs carried by the rim of the wheel through resilient media. The particularly novel feature of my device is the disposition and relation of the resilient media to the hub and rim and the means provided to enclose said media for protection against dust and dirt, without interference with the elasticity of the elements. Another novel and particularly useful feature of my device is the relation of the radial extensions and the rim. Although these extensions and the rim are resiliently related under normal conditions, in the event of an accidental rupture of such resilient relation the extensions would contact the rim without damage and thus provide an emergency adjustment of the wheel.

In the drawings filed herewith I have illustrated one specific embodiment of my invention but it is to be understood that I do not consider my invention limited to the specific embodiment hereinafter fully described but refer for its scope to the claims appended hereto.

Figure 1:
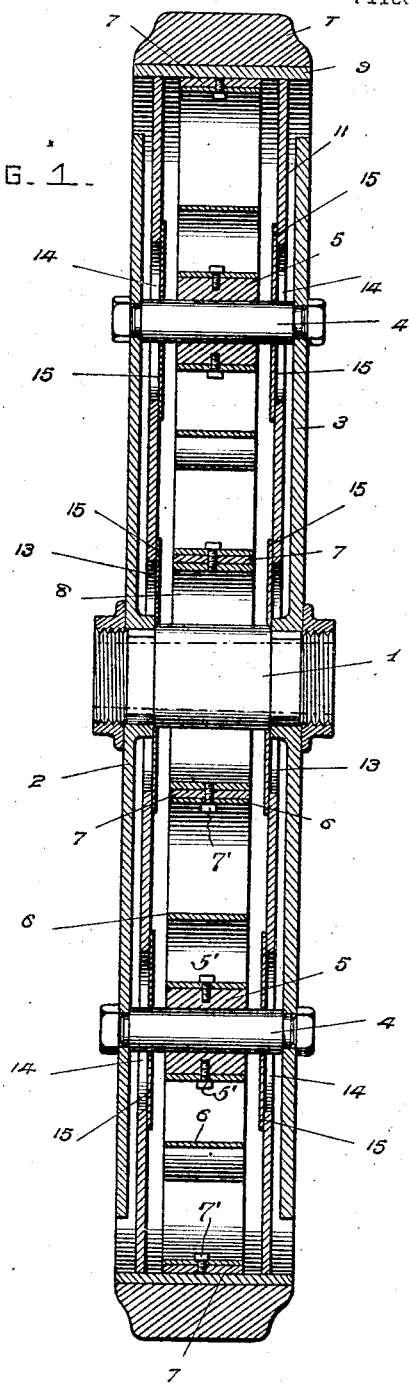
Fig. 1 is a section on the line 1—1 of Fig. 3.
Figure 2:
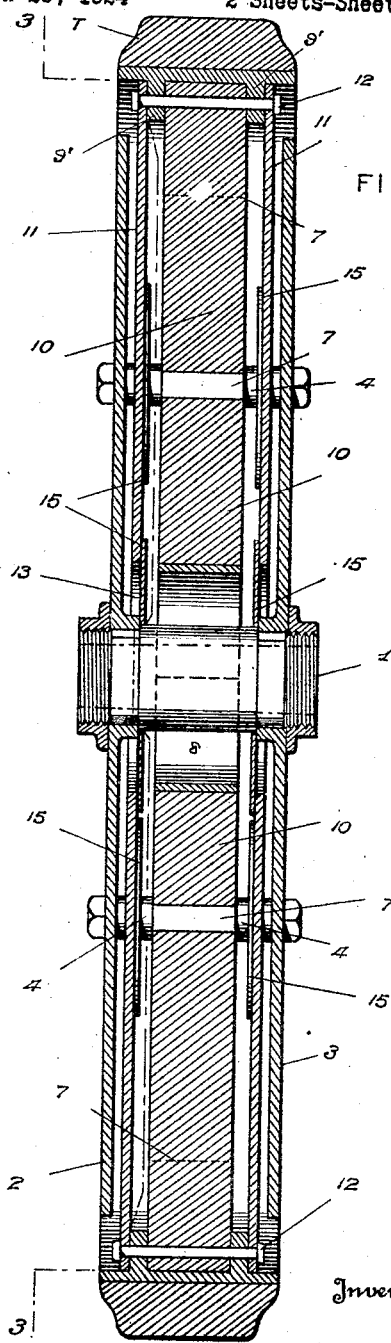
Fig. 2 is a section on the line 2—2 of Fig. 3.
Figure 3:
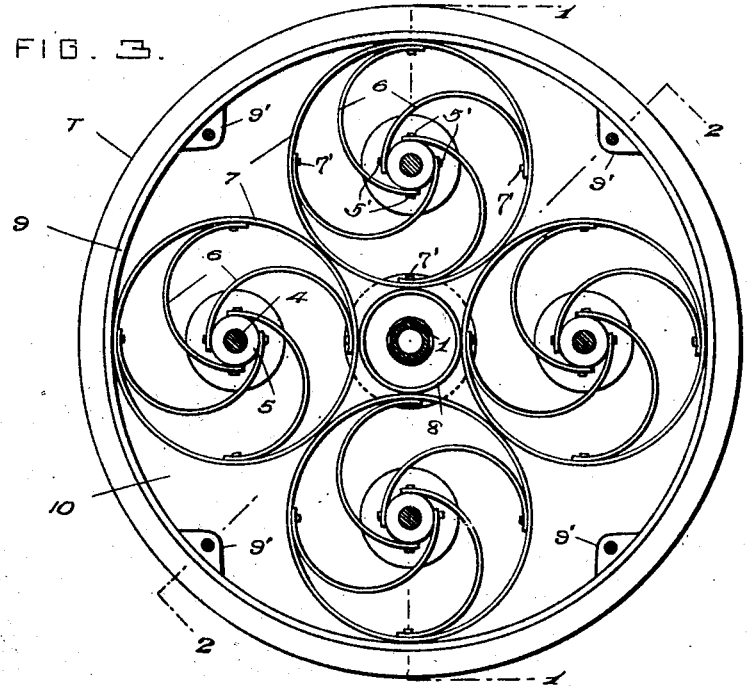
Fig. 3 is a section on the line 3—3 of Fig. 2.
Figure 4:
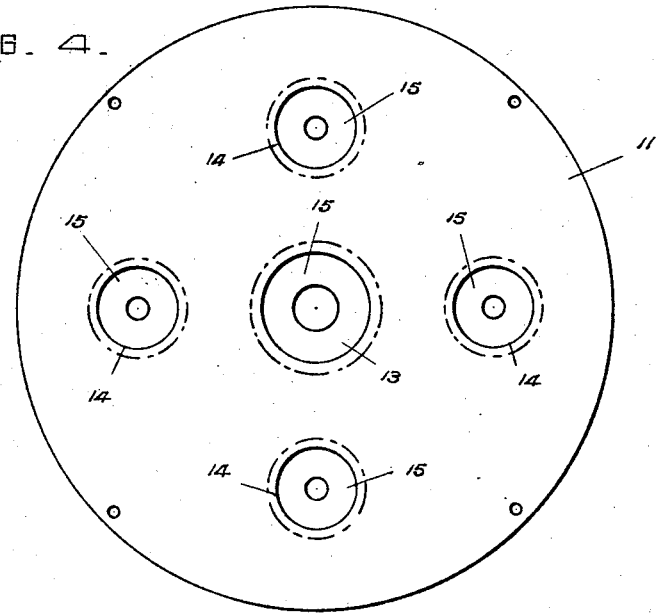
Fig. 4 is a side elevation of one of the cover discs.

My improved wheel is mounted upon the axle by the hub 1 to which radial extensions 2 and 3 are suitably fixed. These radial extensions 2 and 3 are carried by connecting bolts 4 upon which are mounted spools 5 to which are connected, by bolts 5' or any other suitable means, semi-circular springs 6 supported by the casings 7, to which they are attached by bolts 7' or any other suitable means. Centrally disposed relative to the casings 7 is the casing 8 surrounding the hub 1. The rim 9 carries the casings 7 and is peripherally disposed relative thereto. The spaces within the rim 9 between the casings 7 may be provided with filler blocks 10 to add stability to the wheel, if desired.

Any suitable form of tire T may be attached to the rim 9 in any ordinary way.

I provide at suitable points upon the edges of the rim 9 ears 9' to which are attached discs 11 by screws 12. Each disc 11 is provided with a centrally disposed orifice 13 to permit the passage therethrough of the hub 1 and suitably disposed orifices 14 to permit the passage of the bolts 4. I provide flexible curtains 15 surrounding the hub 1 and the bolts 4 to cover these orifices 13 and 14.

It will be obvious that I may provide my wheel with two or more of the casings 7 with their resilient mountings upon the radial extensions 2 and 3, four being illustrated in the embodiment of my invention shown in the drawings.

It is to be noted that the rim 9 is of sufficient width to extend outwardly beyond the cover discs 11 and overlie the peripheries of the radial extensions 2 and 3. These radial extensions 2 and 3 are so designed and related to the rim 9 that their peripheries are disposed adjacent the rim 9 so that in the event of any failure in the resilient mountings of the wheel, the peripheries of the radial extensions 2 and 3 would contact the inner face of the rim 9 thus providing an emergency adjustment in case of accident.

Having described my invention, what I claim is:

1. In a spring wheel, the combination of a main hub; minor hubs connected with the main hub by radial elements; a series of circular casings, each surrounding one of said minor hubs; a rim connected with said casings; a series of semi-circular springs, each minor hub and its casing being provided with a pair thereof, each spring having one of its ends attached to the minor hub and its other end attached to the casing, the points of attachment of each spring being upon a diameter of the wheel; and a second series of semi-circular springs, each minor hub and its casing having a pair of springs of said second series, each spring of said second series having one of its ends attached to a casing and its other end attached to a minor hub, the points of attachment of each spring being on a line parallel with a diameter of the wheel disposed at right angles to a first named diameter of the wheel.

2. In a spring wheel, the combination of a pair of radial elements; bolts connecting said elements; resilient media mounted on said bolts; a rim carrying said media; and discs attached to said rim, covering said media and provided with orifices to permit the passage of said bolts and the axle on which the wheel is mounted, said orifices being of sufficient diameter to permit oscillation of the wheel about said axle and bolts.

3. In a spring wheel, the combination of a pair of radial elements; bolts connecting said elements; resilient media mounted on said bolts; a rim carrying said media; and discs attached to said rim, covering said media and provided with orifices to permit the passage of said bolts and the axle on which the wheel is mounted; and flexible covers for said orifices.

In testimony whereof I affix my signature.

CIRO FIDEL MÉNDEZ.